(12) United States Patent
Lai

(10) Patent No.: US 6,999,311 B1
(45) Date of Patent: Feb. 14, 2006

(54) SCREWLESS FIXING CLIP FOR DISK DRIVE

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 0 days.

(21) Appl. No.: 10/937,232

(22) Filed: Sep. 8, 2004

(51) Int. Cl.
*G06F 1/16* (2006.01)

(52) U.S. Cl. ............ 361/685; 361/683; 312/223.2

(58) Field of Classification Search ........ 361/683–686, 361/724–728; 312/223.1, 223.2
See application file for complete search history.

(56) References Cited

U.S. PATENT DOCUMENTS

| | | | | |
|---|---|---|---|---|
| 5,691,879 A | * | 11/1997 | Lopez et al. ................ | 361/685 |
| 5,936,835 A | * | 8/1999 | Astier ........................ | 361/683 |
| 5,947,571 A | * | 9/1999 | Ho ............................ | 312/223.2 |
| 6,231,139 B1 | * | 5/2001 | Chen ......................... | 312/223.2 |
| 6,549,398 B1 | * | 4/2003 | Chen ......................... | 361/683 |
| 6,834,766 B1 | * | 12/2004 | Lin et al. ................... | 361/683 |
| 6,927,984 B1 | * | 8/2005 | Chen ......................... | 361/801 |

\* cited by examiner

*Primary Examiner*—Lisa Lea-Edmonds
(74) *Attorney, Agent, or Firm*—Pro-Techtor Int'l Services

(57) ABSTRACT

A screwless fixing clip for disk drive having a fixing clip that realizes fixedly clipping position of disk drives that are installed within a computer case by means of fixing plates. The fixing clip eliminates need for screws, and only utilizes a pressure plate configured on a clip plate to fixedly clasp a folded plate of one end of the fixing plate. A piece configured on an arc-shaped plate of another end of the clip penetrates a catch slot defined in the computer case, and a side of a catch edge configured on a side of the catch slot is fixedly clasped by means of a catch of an inner edge of the piece, thereby rapidly and easily fixedly clipping position of the disk drives that are installed within the computer by means of the fixing plates.

1 Claim, 3 Drawing Sheets

SCREWLESS FIXING CLIP FOR DISK DRIVE

BACKGROUND OF THE INVENTION (a) Field of the Invention

The present invention relates to a fixing clip for disk drives, and more particularly to a fixing clip that firmly clips one disk drive or more than one disk drive within a computer case by means of fixing plates, and without need for screws, which thus facilitates rapid installation of the disk drives, and realizes saving in labor and facilitates assemblage of a computer.

(b) Description of the Prior Art

Referring to FIG. 1, which shows a conventional disk drive utilizing one end of a fixing plate 100 to connect to a disk drive, and another end of the fixing plate 100 is firmly secured to a computer case 200. A U-shaped indent 101 is defined in a left side of the fixing plate 100, and a right side of the fixing plate 100 is provided with an insert piece 102, and the insert piece 102 is fixedly inserted within an insert slot of the computer case 200. The U-shaped indent 101 disposedly astrides a fixing post 201 of the computer case 200, and a screw 300 is utilized to screw firmly into screw holes 2011 of the fixing post 201, thereby fixedly clasping the fixing plate 100. Because a plurality of disk drives can be installed in the computer case 200, and because each of the disk drives necessarily utilizes the fixing plate 100 and the screw 300 to firmly screw each of the disk drives to the computer case 200, thus, apart from expenditure in man power and time consumption required in assembling such a configuration of disk drives, moreover, space within the computer case 200 is restricted, and already occupied by many electrical devices, which thereby results in extreme difficulty during assembly process.

SUMMARY OF THE INVENTION

A primary objective of the present invention is to provide a fixing clip that firmly clips one disk drive or more than one disk drive within a computer case by means of fixing plates, thereby eliminating need for screws, and facilitating rapid installation of the disk drives, which thus realizes saving in labor and facilitates assemblage of a computer.

DETAILED DESCRIPTION OF THE PREFERRED EMBODIMENTS

Figure 1:
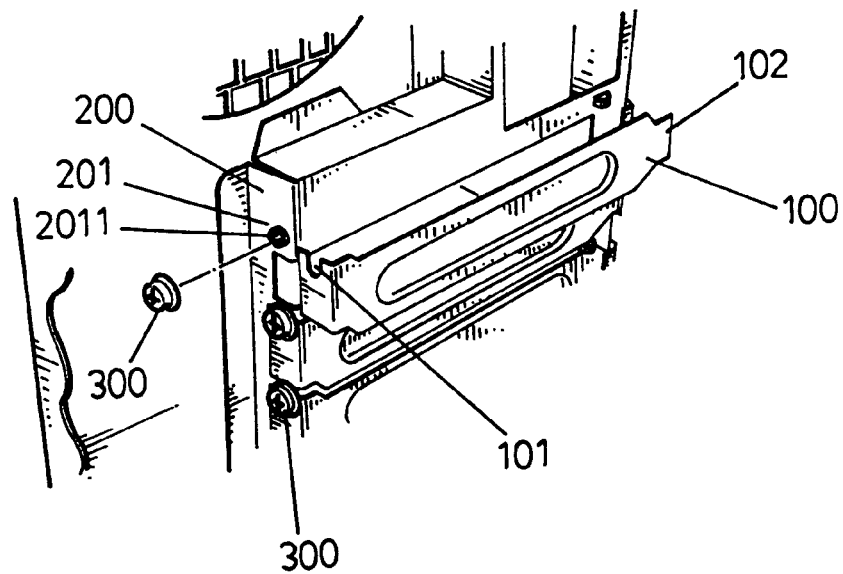
FIG. 1 shows a structural view of a conventional product.
Figure 2:
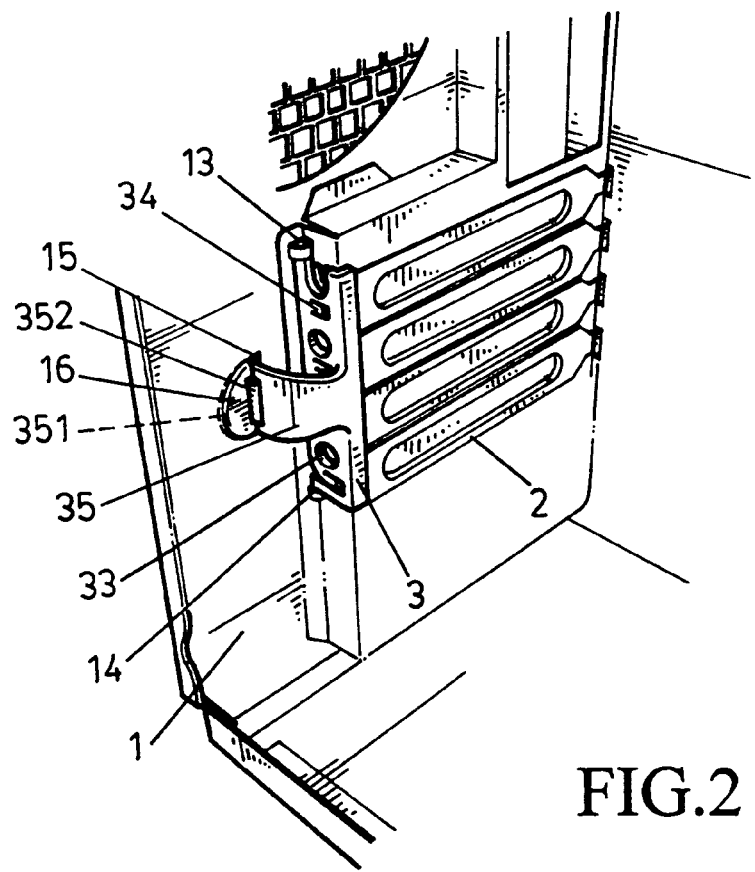
FIG. 2 shows a structural assembled view according to the present invention.
Figure 3:
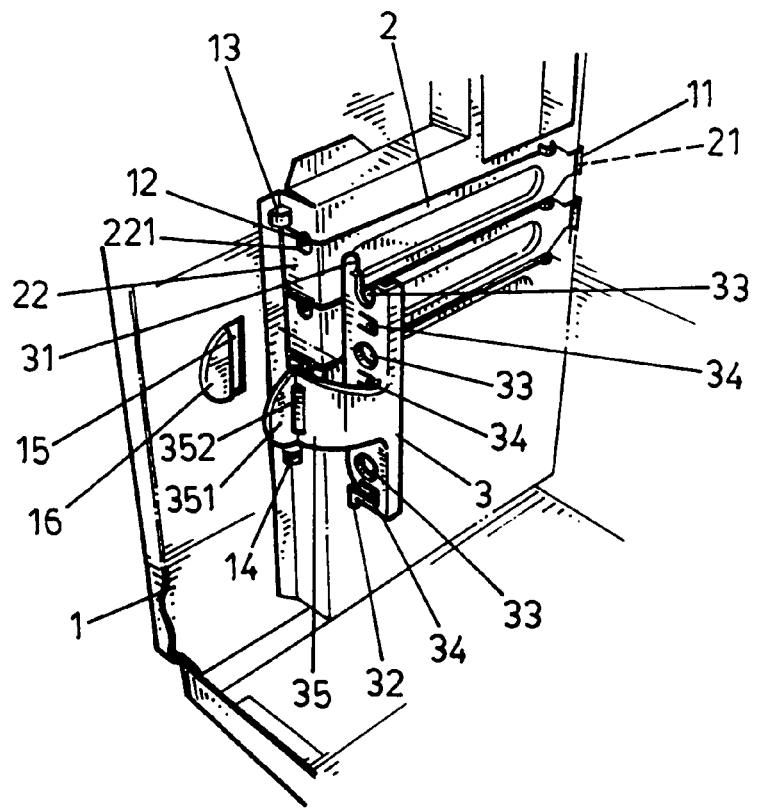
FIG. 3 shows a partial exploded view according to the present invention.
Figure 5:
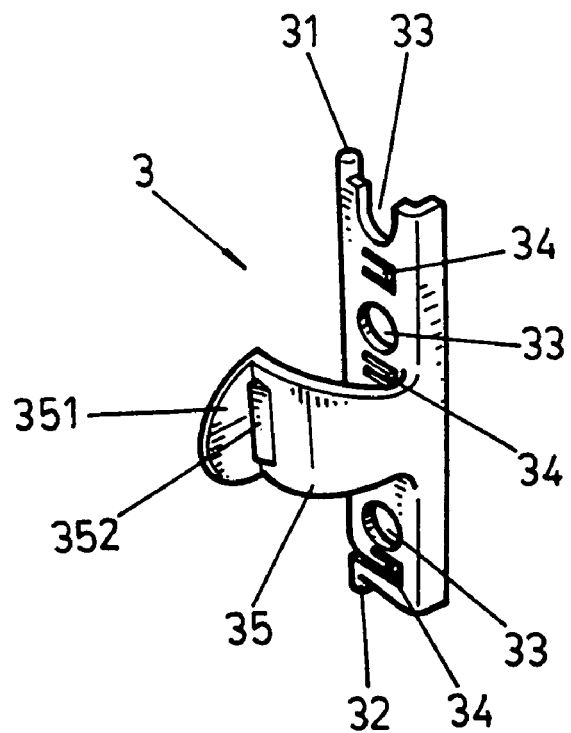
FIG. 5 shows a general view of a fixing clip according to the present invention.
Figure 6:
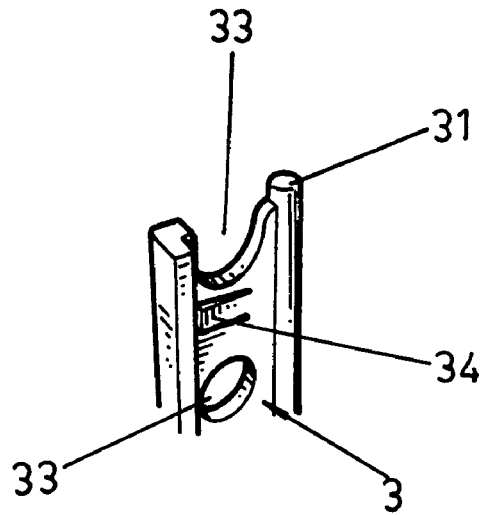
FIG. 6 shows a partial structural view of the fixing clip according to the present invention.

Referring to FIGS. 2 and 3, a plurality of fixing plates 2 are configured to one end of a computer case 1, each of which are connected to a disk drive. An insert piece 21 of one end of each of the fixing plates 2 is inserted into a separate insert hole 11 of the computer case 1, and another end of each of the fixing plates 2 is folded to form a 90 degree folded plate 22, atop of which is provided with a U-shaped indent 221. Each of the U-shaped indents 221 astride and connect to a separate fixing post 12 of the computer case 1. The present invention is characterized in that:

A fixing clip 3 can simultaneously fixedly clasp and thereby secure position of the folded plates 22 of the plurality of fixing plates 2. Wherein, protruding pieces 31 and 32 configured on top and bottom ends of the clip 3 respectively can separately insert into hook rings 13 and 14 respectively of the computer case 1, and which thereby secures position thereat. A plurality of circular post holes 33 (see FIG. 5) are defined in a clip plate of the clip 3. The post holes 33 separately disposedly sheathe onto the plurality of fixing posts 12 of the computer case 1. A pressure plate 34 is disposedly configured between adjacent post holes 33 (see FIG. 6), whereby the pressure plate 34 compactly clasps the folded plates 22 of the fixing plates 2, thereby fixing position of the fixing plates 2. An arc-shaped plate 35 extends from a center of the clip 3. An inner edge of a semicircular piece 351 configured on a top end of the arc-shaped plate 35 is provided with a tapered catch 352. One end of the computer case 1 is provided with a rectangular shaped catch slot 15, which provides for the piece 351 to pass therein. A side edge of the catch slot 15 is configuredly adapted as a semicircular catch edge 16. The piece 351 of the clip 3 inserts into another side of the catch slot 15, thereby enabling the catch 352 to clasp a side of the catch edge 16 (see FIG. 2). With such a configuration, rapid and easy compact fixedly clipping of one or more than one fixing plate 2 is realized.

Figure 4:
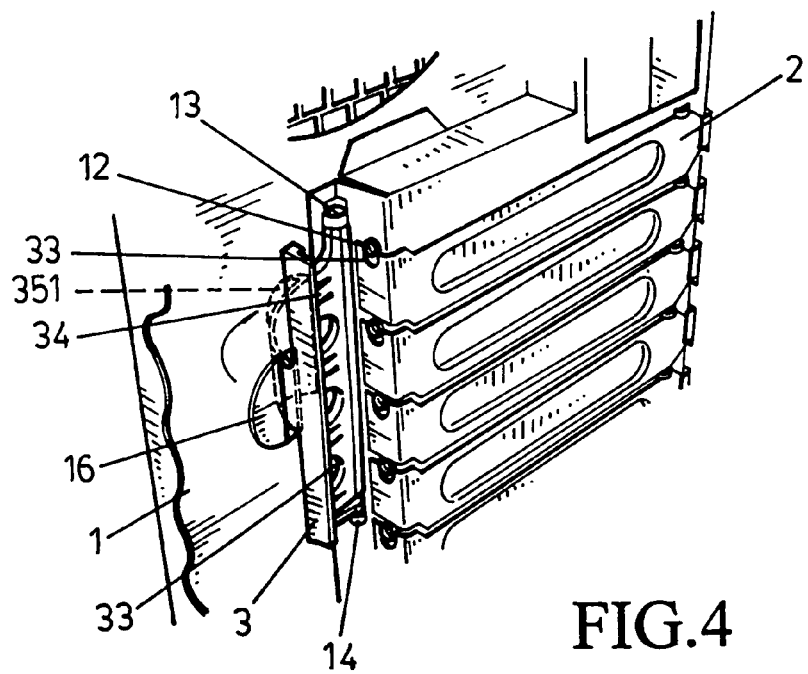
FIG. 4 shows a schematic elevational view of an embodiment according to the present invention.

Referring to FIG. 4, when wishing to loosen the clip 3 in order to disconnect and dismantle the fixing plates 2 from the disk drives, a user need only use a thumb to press on the arc-shaped plate 35 of the clip 3, thereby releasing the catch 352 of the clip 3 from claspment of the catch edge 16, and which thus eliminates need for use of any tool, while realizes easy dismantling of the configuration as described above.

In conclusion, the present invention utilizes a fixing clip 3 to eliminate need for screws, while actualizing simultaneous fixedly clasping of a plurality of fixing plates 2 fixed on one side of the disk drives, and thus realizes savings in labor and time, and expedites assembly process.

What is claimed is:

1. A screwless fixing clip for disk drive comprising fixing plates, which are configured to one end of a computer case, and each of the fixing plates is connected to a disk drive, an insert piece of one end of each of the fixing plates is inserted into a separate insert hole of the computer case, and another end of each of the fixing plates is configured with a folded plate, atop of which is provided with a U-shaped indent, and each of the U-shaped indents astride and connect to a separate fixing post of the computer case; and characterized in that:

the fixing clip can fixedly clasp and thereby secure position of the folded plate of the fixing plates; protruding pieces are configured on top and bottom ends of the clip respectively, and which can separately insert into hook rings of the computer case; a plurality of post holes are defined in a clip plate of the clip, and the post holes separately disposedly sheathe onto fixing posts of the computer case; a pressure plate is disposedly configured between adjacent post holes, and the protruding pressure plate can fixedly clasp the folded plates of the fixing plates; a piece configured on an arc-shaped plate of one end of the clip penetrates a catch slot defined in the computer case, and a catch of an inner edge of the piece can fixedly clasp a side of a catch edge configured on a side of the catch slot, which thereby fixedly clips position thereat.

* * * * *